United States Patent
Ghosh et al.

(10) Patent No.: US 11,002,335 B2
(45) Date of Patent: May 11, 2021

(54) CONTROLLABLE MAGNETO-RHEOLOGICAL DEVICE FOR GAS TURBINE ENGINE

(71) Applicant: General Electric Company, Schenectady, NY (US)

(72) Inventors: Shuvajyoti Ghosh, Bangalore (IN); Narayanan Payyoor, Bangalore (IN); Surender Reddy Bhavanam, Bangalore (IN); Richard Schmidt, Loveland, OH (US); Tod Robert Steen, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 671 days.

(21) Appl. No.: 15/346,202

(22) Filed: Nov. 8, 2016

(65) Prior Publication Data

US 2018/0128342 A1    May 10, 2018

(51) Int. Cl.
*B60K 5/12* (2006.01)
*F01D 25/04* (2006.01)
(Continued)

(52) U.S. Cl.
CPC .............. *F16F 9/535* (2013.01); *F01D 25/04* (2013.01); *F01D 25/164* (2013.01);
(Continued)

(58) Field of Classification Search
CPC .. F16F 9/535; F01D 25/04; B60K 5/12; F16C 27/04
(Continued)

(56) References Cited

U.S. PATENT DOCUMENTS

| 4,600,863 A * | 7/1986 | Chaplin ............... B63H 21/302 |
| | | 318/114 |
| 5,277,281 A | 1/1994 | Carlson et al. |

(Continued)

FOREIGN PATENT DOCUMENTS

EP    3 159 559 A1    4/2017

OTHER PUBLICATIONS

International Search Report and Written Opinion issued in connection with corresponding PCT Application No. PCT/US2017/054348 dated Dec. 19, 2017.
(Continued)

*Primary Examiner* — Christopher P Schwartz
(74) *Attorney, Agent, or Firm* — Dority & Manning, P.A.

(57) ABSTRACT

A controllable magneto-rheological device includes an annular cylinder formed by inner and outer walls connected at first and second opposing ends and forming an inner shaft configured to receive an operational component of an engine, generator or other device including one or more rotating structures. A magneto-rheological fluid is provided to fill a volume between the inner and outer walls of the annular cylinder. A plurality of electro-magnetic coils are positioned around the outer wall of the annular cylinder. One or more current controllers are coupled to the plurality of electro-magnetic coils for introducing a current through each of the electro-magnetic coils and corresponding magnetic flux through the magneto-rheological fluid. A level of current provided to each of the plurality of electro-magnetic coils directly affects the viscosity of the magneto-rheological fluid and thus the stiffness and damping levels of the controllable magneto-rheological device.

20 Claims, 9 Drawing Sheets

(51) Int. Cl.
*F16F 9/53* (2006.01)
*F16F 15/16* (2006.01)
*F01D 25/16* (2006.01)
*F16F 15/03* (2006.01)
*F16C 27/04* (2006.01)
*F16C 19/26* (2006.01)
*F16F 15/18* (2006.01)

(52) U.S. Cl.
CPC ............ *F16C 27/045* (2013.01); *F16F 15/03* (2013.01); *F16F 15/16* (2013.01); *F05D 2260/96* (2013.01); *F05D 2300/507* (2013.01); *F16C 19/26* (2013.01); *F16F 15/18* (2013.01); *F16F 2222/06* (2013.01); *F16F 2224/045* (2013.01)

(58) Field of Classification Search
USPC .............. 188/267, 267.1, 267.2; 267/140.14, 267/140.15; 415/1; 416/1
See application file for complete search history.

(56) References Cited

U.S. PATENT DOCUMENTS

| | | | |
|---|---|---|---|
| 5,398,917 A * | 3/1995 | Carlson | F16F 9/535 188/267.2 |
| 5,452,957 A | 9/1995 | Duggan | |
| 5,492,312 A * | 2/1996 | Carlson | F16F 9/535 188/267.2 |
| 5,497,861 A | 3/1996 | Brotz | |
| 5,738,343 A | 4/1998 | Nakajima et al. | |
| 5,788,029 A * | 8/1998 | Smith | F16F 7/1005 188/267 |
| 5,927,699 A * | 7/1999 | Nakajima | H02M 3/33576 267/140.13 |
| 6,068,249 A * | 5/2000 | Shtarkman | F16F 9/535 188/267.1 |
| 6,116,784 A | 9/2000 | Brotz | |
| 6,427,813 B1 * | 8/2002 | Carlson | F16F 9/535 188/267.2 |
| 7,018,102 B1 | 3/2006 | Brotz | |
| 8,205,445 B2 | 6/2012 | Browne et al. | |
| 8,413,772 B2 * | 4/2013 | Wereley | B64C 27/51 188/267.2 |
| 8,413,773 B2 | 4/2013 | Anderfaas et al. | |
| 8,527,247 B1 | 9/2013 | Wilson et al. | |
| 8,992,161 B2 * | 3/2015 | Hindle | F01D 25/04 415/1 |
| 9,091,309 B2 | 7/2015 | Battlogg | |
| 9,103,321 B1 | 8/2015 | Bardia | |
| 2007/0144842 A1 * | 6/2007 | Zhou | F16F 9/535 188/267 |
| 2008/0148708 A1 * | 6/2008 | Chou | F01D 5/02 60/268 |
| 2009/0020381 A1 * | 1/2009 | Hindle | F16F 15/03 188/267 |
| 2009/0016984 A1 | 2/2009 | Storace et al. | |
| 2011/0255967 A1 * | 10/2011 | Welsh | F16F 15/366 416/1 |
| 2012/0292143 A1 | 11/2012 | Anderfaas et al. | |
| 2013/0051982 A1 | 2/2013 | Hindle et al. | |
| 2014/0163904 A1 * | 6/2014 | Bechhoefer | F03D 7/047 702/34 |
| 2015/0217866 A1 | 8/2015 | Spina et al. | |
| 2015/0369326 A1 * | 12/2015 | Modrezejewski | F16F 13/30 188/267.1 |
| 2017/0067860 A1 * | 3/2017 | Grabill | G01P 3/481 |

OTHER PUBLICATIONS

Zhu et al, A Magneto-rheological Fluid Squeeze Film Damper for Rotor Vibration Control, pp. 516-522.
Kumar et al., Development of Smart Squeeze Film Dampers for Small Rotors, Procedia Engineering, 144, 2016, pp. 790-800.
Carmignani et al., Design of a novel magneto-rheological squeeze-film damper, Smart Materials and Structures, vol. 15, Institute of Physics Publishing, 2006, pp. 164-170.
Xu, et al., Squeeze flow behaviors of magnetorheological plastomers under constant volume, The Society of Rheology, Inc., 2014, pp. 659-679.

* cited by examiner

CONTROLLABLE MAGNETO-RHEOLOGICAL DEVICE FOR GAS TURBINE ENGINE

FIELD

The present subject matter relates generally to a controllable magneto-rheological device, or more particularly to a gas turbine engine having a magneto-rheological device for controlling vibrational response.

BACKGROUND

Numerous applications involving high performance mechanical components generate undesired vibrations. For example, engines for use in vehicles, power systems or other applications can sometimes encounter vibrational response among operational components that potentially can cause component degradation over time and/or inefficient system performance. Gas turbine engines for use in aircraft, marine, industrial or other environments are a particular system in which vibrational control can be an important consideration.

Known systems and devices for improving vibratory control within an engine or other environment can include passive and/or active control structures. Passive features such as bearings, dampers, springs, shock absorbers or other devices can help to absorb or dissipate excess levels of mechanical energy. Active control features such as attenuators or the like can help reduce excessive levels of structural movement among operational components of an engine. However, even with such known devices, addressing vibratory control across a wide range of applications and operating conditions can pose unique challenges.

For instance, within the particular environment of a gas turbine engine, numerous vibrational concerns may arise. Synchronous vibrations can occur during normal engine operation due to conditions such as imbalance, and/or misalignment of rotating components, and/or damage of engine components. Non-synchronous vibrations can result from bearing defects, looseness among engine components, effects of adjacent system components, or resonant modes being excited by the rotating components, or other operational components. For example, vibrations can occur due to rotor bow or thermal bowing of a rotor shaft caused by uneven rotor temperature differentials after engine shutdown. Additional instabilities can also arise within a gas turbine engine in the form of cross coupled stiffness (Alford) forces, Engine Vibration Related Noise (EVRN) or other conditions.

Accordingly, systems and methods for addressing different types of vibration within a given environment would be useful. Specifically, providing a controllable device for reducing vibration within a gas turbine engine or other system is desired.

BRIEF DESCRIPTION

Aspects and advantages of the invention will be set forth in part in the following description, or may be obvious from the description, or may be learned through practice of the invention.

In one exemplary embodiment of the present disclosure, a controllable magneto-rheological device is provided. The controllable magneto-rheological device can include an annular cylinder formed by inner and outer walls connected at first and second opposing ends. The annular cylinder can form an inner shaft configured to receive an operational component. The controllable magneto-rheological device also can include a magneto-rheological fluid provided to fill a volume between the inner wall and the outer wall of the annular cylinder. The controllable magneto-rheological device also can include a plurality of electro-magnetic coils positioned around the outer wall of the annular cylinder. The controllable magneto-rheological device also can include one or more current controllers coupled to the plurality of electro-magnetic coils for introducing a current through each of the electro-magnetic coils and corresponding magnetic flux through the magneto-rheological fluid. A level of current provided to each of the plurality of electro-magnetic coils by the one or more current controllers directly affects the viscosity of the magneto-rheological fluid and thus the stiffness and damping levels of the controllable magneto-rheological device.

In another exemplary embodiment of the present disclosure, a gas turbine engine is provided. The gas turbine engine can include a compressor section, a turbine section, and one or more controllable magneto-rheological devices. The compressor section can include one or more compressors. The turbine section can be located downstream of the compressor section and can include one or more turbines. The one or more controllable magneto-rheological devices can be positioned relative to one or more operational components of the one or more compressors and the one or more turbines. Each controllable magneto-rheological device can include an annular cylinder formed by inner and outer walls connected at first and second opposing ends, the annular cylinder forming an inner shaft configured to receive an operational component of the gas turbine engine. Each controllable magneto-rheological device also can include a magneto-rheological fluid provided to fill the volume between the inner wall and the outer wall of the annular cylinder. Each controllable magneto-rheological device also can include a plurality of electro-magnetic coils positioned around the outer wall of the annular cylinder. Each controllable magneto-rheological device also can include one or more current controllers coupled to the plurality of electro-magnetic coils for introducing a current through each of the electro-magnetic coils and corresponding magnetic flux through the magneto-rheological fluid.

In another exemplary embodiment of the present disclosure, a method for controlling a magneto-rheological device can include acquiring, by one or more processors, sensor data from one or more sensors positioned within an operational device. The method also can include determining, by the one or more processors, one or more frequency components of the sensor data as corresponding to a source of vibration within the operational device. The method also can include determining, by the one or more processors, one or more stiffness/damping modes (e.g., symmetrical mode, asymmetrical mode, rotational mode) for operation of a magneto-rheological device, wherein the one or more stiffness/damping modes are determined based at least in part on the sensor data and the one or more frequency components. The method also can include generating, by the one or more processors, a waveform signal defined by one or more signal characteristics (e.g., amplitude, phase, waveform shape), wherein the one or more signal characteristics are determined based at least in part on the one or more stiffness/damping modes. The method also can include controlling current in a plurality of coils within the magneto-rheological device in accordance with the waveform signal and one or more signal characteristics.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
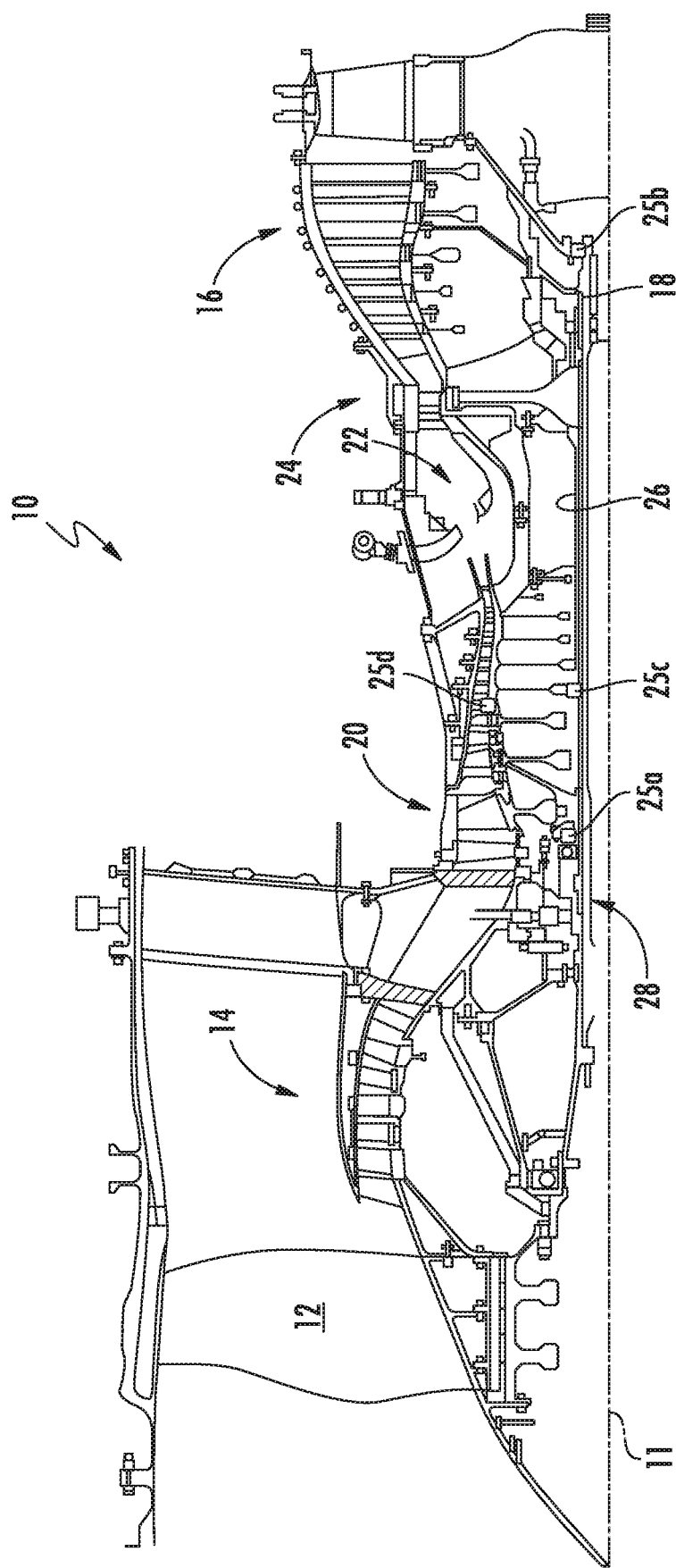
FIG. 1 is a schematic cross-sectional view of an exemplary gas turbine engine according to various embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," "third," etc. may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially." refers to moving in a direction toward the outer engine circumference, or a component being relatively closer to the outer engine circumference as compared to another component. As used herein, the terms "lateral" or "laterally" refer to a dimension that is perpendicular to both the axial and radial dimensions.

Example aspects of the present disclosure are directed to magneto-rheological devices for use in various applications, e.g., gas turbine engines, and corresponding methods for controlling the stiffness/damping of such devices. In general, a magneto-rheological device in accordance with example aspects of the present disclosure can correspond to a generally cylindrically device that provides controllable stiffness or damping effects in a radial direction relative to the cylindrical device by inducing a magnetic field and corresponding flux through a magneto-rheological fluid contained therein. More particularly, a controllable magneto-rheological device can include an annular cylinder formed by inner and outer walls connected at first and second opposing ends, a magneto-rheological fluid provided to fill a volume between the inner and outer walls, and a plurality of electromagnetic coils having optional magnetic cores. The stiffness of the opposing ends can be configured to not dominate the stiffness created by the magneto-rheological fluid. The annular cylinder can form an inner shaft configured to receive an operational component, such as a bearing, rotor or other component within an engine, motor, generator or other operational device that includes one or more rotating structures. The plurality of electro-magnetic coils can be positioned around the outer wall of the annular cylinder. In some examples, the plurality of electro-magnetic coils can be positioned radially around and extending outward from the outer wall of the annular cylinder. The optional magnetic cores can be positioned such that each magnetic core is disposed within one of the plurality of electro-magnetic coils. At least one current controller can be coupled to the plurality of electro-magnetic coils for introducing a current through each of the electro-magnetic coils and corresponding magnetic flux through the magneto-rheological fluid. One or more sensors for detecting one or more operating characteristics of an operational device (e.g., an engine, generator, etc.) can be coupled to at least one current controller such that one or more current levels provided by the current controller to the plurality of electro-magnetic coils are determined at least in part from the one or more operating characteristics. One or more desired levels of current can be provided from the at least one current controller to each of the plurality of electro-magnetic coils to provide an adaptive mission-specific or geometry-specific configuration of stiffness and/or damping levels within the controllable magneto-rheological device.

Example aspects of the present disclosure can provide many advantages. For example, utilization of a magneto-rheological device with controllable stiffness/damping in accordance with example embodiments can provide vibratory control within a given environment. In gas turbine engines and other applications, the dynamics application of such a magneto-rheological device can have a technical effect of absorbing energy from rotating elements including rotors and the like to yield improved rotor dynamic responses and overall improved efficiency of engine operation. This can help provide better clearance control between engine components by reducing the potential for unwanted contact between a turbine rotor and other adjacent static components such as a supporting shaft structure and the like. Use of the disclosed devices can help mitigate potential effects of rotor bow, resulting in shorter engine start up times. Potential instability in the form of cross coupled stiffness (Alford) forces or other non-synchronous vibration (NSV) can also advantageously be reduced. Additional stability can also be realized by avoiding whirl and facilitating stable operations under oil-loss conditions.

Advantages can be achieved by providing multiple possible configurations for controlling the operation of a magneto-rheological device. Different configurations can be employed in an adaptive manner to provide variable mission-specific and/or geometry-specific stiffness/damping. A first example operational configuration can provide additional stiffness to a rotational component during startup of a gas turbine engine. A second example operational configuration can provide additional energy absorption capabilities for a rotational component during operation. A third example operational configuration can provide targeted stiffness or damping at specific locations to offset dynamic response evident during operation. In such instances, customizable stiffness and/or damping can be employed to shift a resonant mode away from being exhibited at an otherwise expected operating speed.

Figure 2:
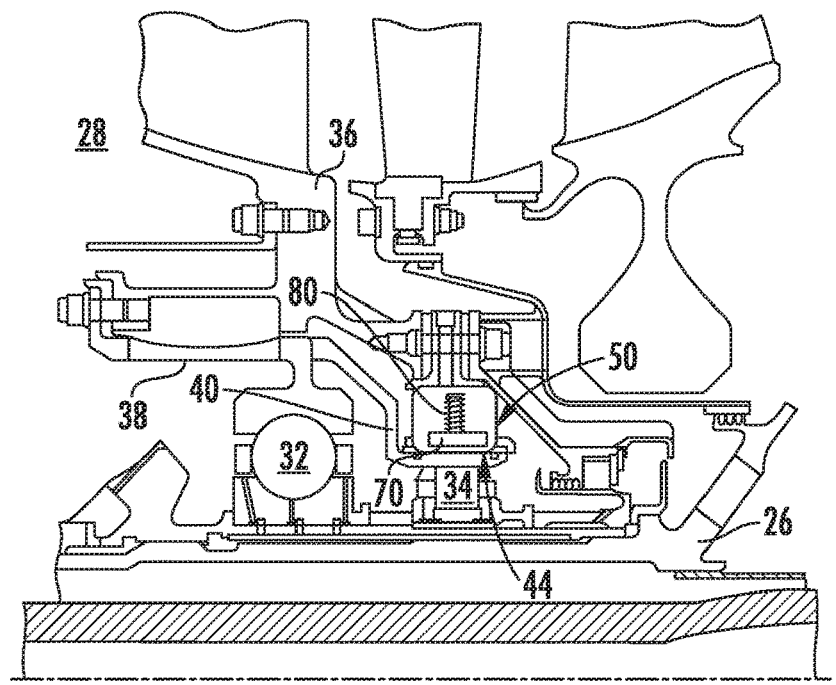
FIG. 2 is a schematic, cross-sectional view of a forward end of a core of the exemplary gas turbine engine of FIG. 1 according to various embodiments of the present subject matter.
Figure 3:
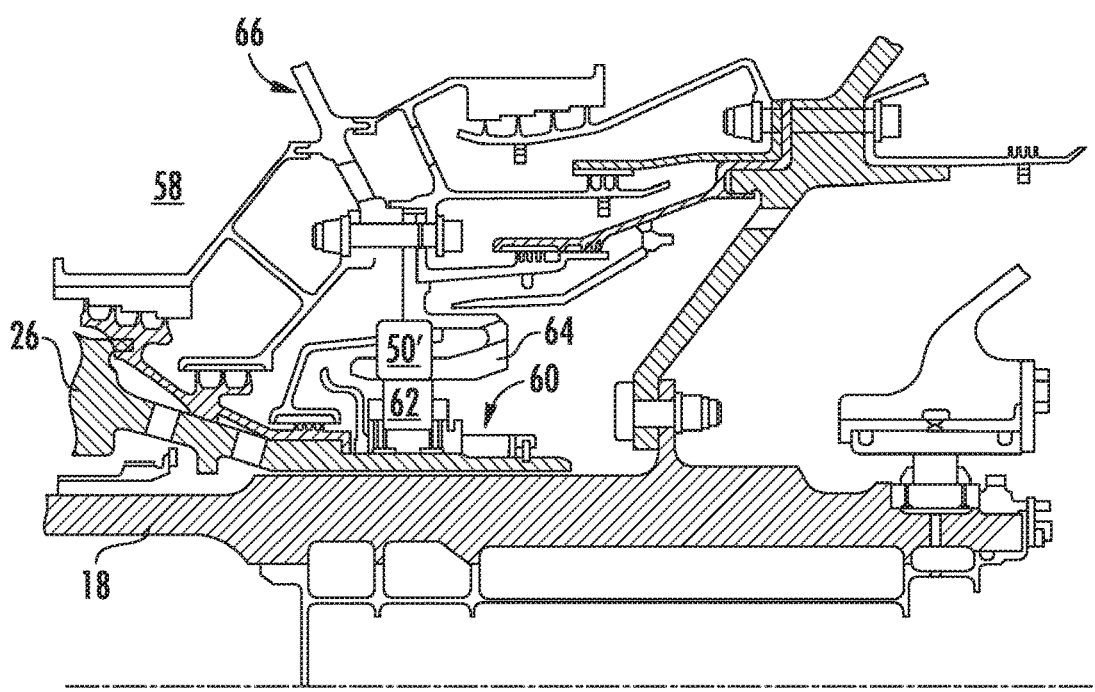
FIG. 3 is a schematic, cross-sectional view of an aft end of a core of the exemplary gas turbine engine of FIG. 1 according to various embodiments of the present subject matter.

Referring now to the figures, it should be appreciated that some embodiments of the disclosed technology concern gas turbine engines including one or more controllable magneto-rheological devices. Example aspects of such gas turbine engines are depicted in FIGS. 1-5, respectively. In some examples, gas turbine engines such as depicted in FIG. 1 generally include a compressor section including one or more compressors as well as a turbine section located downstream of the compressor section and including one or more turbines. Magneto-rheological devices can be positioned relative to one or more operational components of the one or more compressors and/or the one or more turbines, such as depicted in FIGS. 2 and 3.

FIG. 1 illustrates one embodiment of an example gas turbine engine 10 which can incorporate various aspects of the disclosed technology. Gas turbine engine 10 has a longitudinal axis 11 generally aligned with a main turbine rotor, around which various turbine components can be axially positioned. FIG. 1 depicts a cross-sectional view of an upper portion of such components as provided on one side of longitudinal axis 11. Gas turbine engine 10 can include a fan 12, a low pressure compressor or "booster" 14 and a low pressure turbine ("LPT") 16 collectively referred to as a "low pressure system." The LPT 16 drives the fan 12 and booster 14 through an inner shaft 18, also referred to as an "LP shaft." The engine 10 also includes a high pressure compressor ("HPC") 20, a combustor 22, and a high pressure turbine ("HPT") 24, collectively referred to as a "gas generator" or "core." The HPT 24 drives the HPC 20 through an outer shaft 26, also referred to as an "HP shaft." Together, the high and low pressure systems are operable in a known manner to generate a primary or core flow as well as a fan flow or bypass flow. The inner and outer shafts 18 and 26 are mounted for rotation in several rolling-element bearings, aspects of which are discussed with more particular reference to FIGS. 2 and 3. The bearings are located in enclosed portions of the engine 10 referred to as "sumps."

A magneto-rheological device with controllable stiffness/damping as disclosed herein can be integrated at one or more locations within a gas turbine engine 10 as depicted in FIG. 1. A first example location 25a for a magneto-rheological device corresponds to location relative to a first bearing, which is illustrated in more particular detail in FIG. 2. A second example location 25b for a magneto-rheological device corresponds to a location relative to a second bearing, which is illustrated in more particular detail in FIG. 3. A third example location 25c for a magneto-rheological device corresponds to a mid-rotor location. A fourth example location 25d for a magneto-rheological device corresponds to a position relative to one or more turbine vanes. Although specific locations are depicted in FIG. 1, it should be appreciated that a magneto-rheological device with controllable stiffness/damping as disclosed herein can be positioned at still further specific locations within a gas turbine engine or other environments that are susceptible to vibrational effects.

While the illustrated engine 10 depicted in FIG. 1 is a high-bypass turbofan engine, the magneto-rheological devices and associated technology disclosed herein can be equally applicable to turbo prop, turbojet, and turboshaft engines, as well as turbine engines used for other vehicles or in stationary applications. It should also be appreciated that the turbine engines incorporating the disclosed magneto-rheological device technology can be employed for use in a variety of applications, including turbine engines in aircraft. When used in aircraft applications, advantages can be achieved including reduced air motoring on engine starts, quicker turnaround time for short haul flights, tighter clearances among engine components, improved engine stability and performance, reducing cabin noise due to vibration, as well as improved flight safety and aircraft reliability. In other examples, turbine engines including magneto-rheological devices and associated methods in accordance with the present disclosure can be utilized in other applications such as wind energy sources and vehicles, including but not limited to aircraft, helicopter, automobile, boat, submarine, train and/or any other applicable engine-based environments that can potentially experience high-performance vibrational dynamics.

FIG. 2 depicts a first example location of a magneto-rheological device positioned within a gas turbine engine relative to rolling-element bearings. More particularly, FIG. 2 shows a front sump 28 of the engine 10 in more detail. The forward end of the outer shaft 26 is carried by a ball forward bearing 32 and a roller aft bearing 34 which in common nomenclature are referred to as the "3B bearing" and the "3R bearing," respectively denoting their location and type. A static annular frame member referred to as a fan hub frame 36 surrounds the forward and aft bearings 32 and 34. The forward bearing 32 is connected to the fan hub frame 36 by a forward spring bearing cage 38, and the aft bearing 34 is connected to the fan hub frame 36 by an aft spring bearing cage 40, also sometimes referred to as a squirrel cage or centering spring.

In one example (as illustrated), a magneto-rheological device 50 can be positioned within the front sump 28 of engine 10 proximate to the roller aft bearing, or 3R bearing 34. Magneto-rheological device 50 can include an annular cylinder 70 and a plurality of coils 80 configured such that an inner surface of annular cylinder 70 is positioned relative to a surface 44 of aft spring bearing cage 40. If aft spring bearing cage 40 is not provided, inner surface of annular cylinder 70 can be positioned relative to a cylindrical surface surrounding aft bearing 34. Coils 80 can extend radially outwards toward an outer housing or other rigid structure such as an extension of fan hub frame 36. In other examples, a magneto-rheological device can be positioned relative to other bearings, such as but not limited to the 3B bearing 32, or other operational components within front sump 28.

FIG. 3 depicts a second example location of a magneto-rheological device positioned within a gas turbine engine relative to rolling-element bearings. More particularly, FIG. 3 shows an aft sump 58 of the engine 10 in more detail. The aft end 60 of the outer shaft 26 is carried by an aft bearing 62 near the turbine support which is referred to as the "4R bearing," denoting its location and type. The outer race 64 of the bearing 62 is attached to a static annular frame member 66 of the engine 10.

In one example (as illustrated), a magneto-rheological device 50' can be positioned within the aft sump 58 of engine 10 proximate to the 4R bearing 62. In other examples, a magneto-rheological device can be positioned relative to other bearings or other operational components within aft sump 58. For instance, magneto-rheological device 50' can alternatively be positioned within a suitable gap between operational components near bearing 62, such as between outer race 64 and frame member 66. Such locations can serve to relieve stress for bearing 62 or other bearings operating at a high speed factor, which can sometimes cause non-synchronous vibrations within the gas turbine environment.

Figure 4:
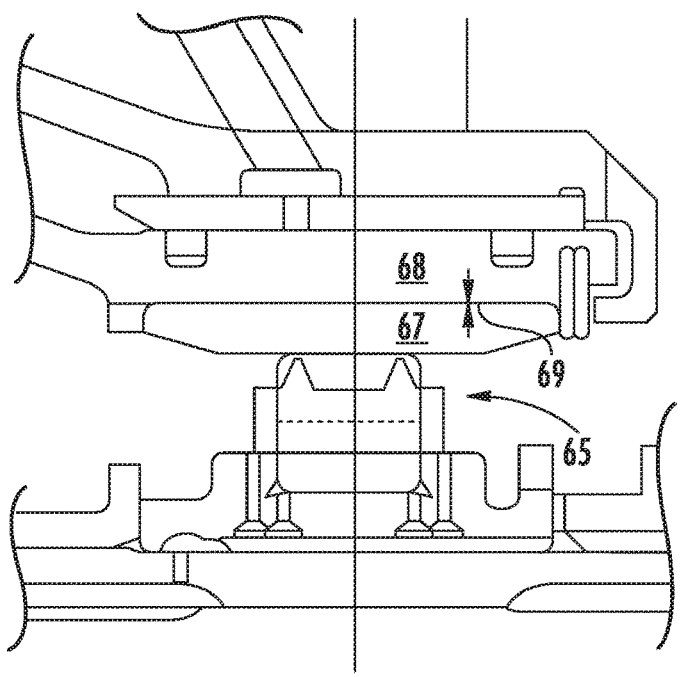
FIG. 4 is a schematic, cross-sectional view of an example bearing within a gas turbine engine without a magneto-rheological device.
Figure 5:
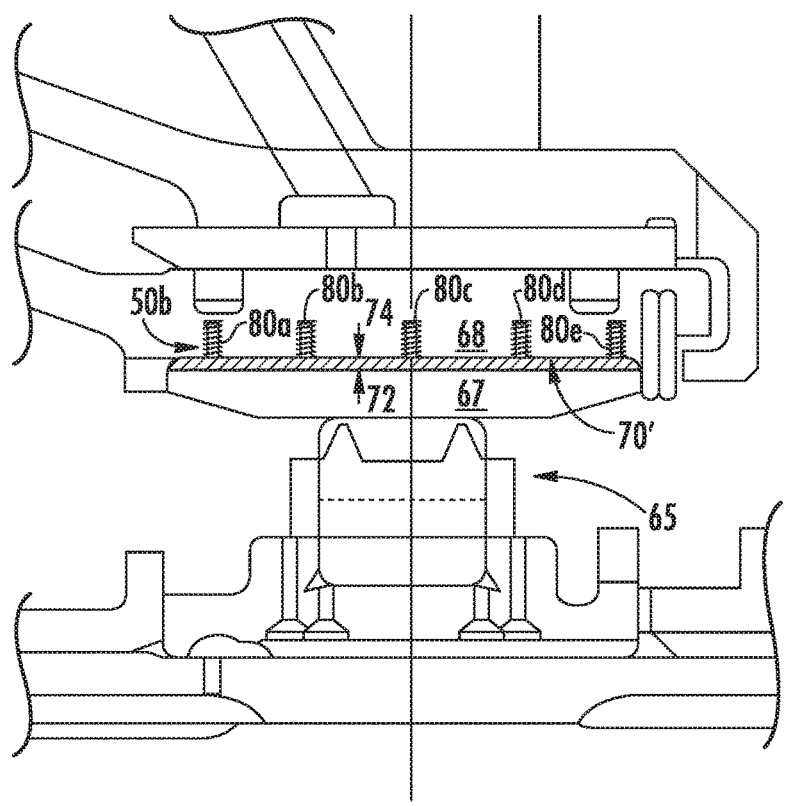
FIG. 5 is a schematic, cross-sectional view of an example bearing within a gas turbine engine including a magneto-rheological device according to various embodiments of the present subject matter.

FIGS. 4 and 5 depict an additional example location of a magneto-rheological device positioned relative to a bearing within a gas turbine engine. The schematic cross-sectional view of FIG. 4 illustrates a bearing 65 positioned within bearing outer race 67 and bearing housing 68. Bearing outer race 67 and bearing housing 68 can be positioned relative to one another such that a relatively small gap 69 is formed between the two components. In some examples, gap 69 can be included for engine bearings operating at a high speed factor, which can sometimes cause non-synchronous vibrations within the engine environment. As depicted in FIG. 5, an example location for a magneto-rheological device 50b in accordance with the disclosed embodiments corresponds to a position within the gap 69 formed between bearing outer race 67 and bearing housing 68. Activation of magneto-rheological device 50b in the location depicted in FIG. 5 can serve to advantageously reduce potential non-synchronous vibrations induced within the bearing and subsequently translated to other nearby engine components.

With more particular reference to FIG. 5, annular cylinder 70' of magneto-rheological device 50b and the magneto-rheological fluid therein can be positioned within gap 69 between a generally cylindrical outer surface of bearing outer race 67 and a generally cylindrical inner surface of bearing housing 68. In particular, inner wall 72 of magneto-rheological device 50b can be positioned adjacent to an outer surface of bearing outer race 67, while outer wall 74 of magneto-rheological device 50b can be positioned adjacent to an inner surface of bearing housing 68. A plurality of annular stacks of electro-magnetic coils can be arranged relative to annular cylinder 70'. The example magneto-rheological device 50b of FIG. 5 includes a first annular stack of electro-magnetic coils corresponding to coils 80a, a second annular stack of electro-magnetic coils 80b, a third annular stack of electro-magnetic coils 80c, a fourth annular stack of electro-magnetic coils 80d, and a fifth annular stack of electro-magnetic coils 80e. It should be appreciated that a greater or lesser number of annular stacks having similar or different spacing relative to one another along a length of annular cylinder 70' can alternatively be used in other magneto-rheological device embodiments. Additional details pertaining to a magneto-rheological device embodiment 50b including multiple annular stacks of electro-magnetic coils can be appreciated from FIG. 8.

Figure 6:
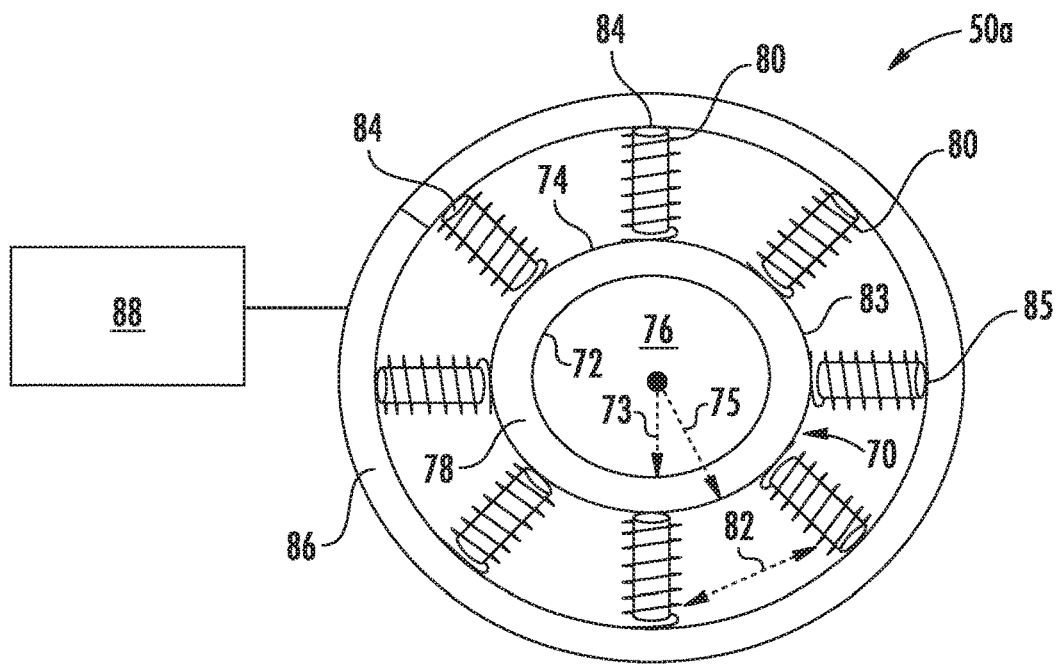
FIG. 6 is a schematic cross-sectional view of a first exemplary magneto-rheological device according to various embodiments of the present subject matter.

FIG. 6 provides a schematic cross-sectional view of a first exemplary magneto-rheological device embodiment according to various aspects of the disclosed technology. Referring now to FIG. 6, magneto-rheological device 50a generally includes an annular cylinder 70 formed by an inner wall 72 and outer wall 74. Inner wall 72 and outer wall 74 can be generally aligned in a concentric fashion along the length of the annular cylinder 70. A first radius 73 associated with cylindrical inner wall 72 is designed to form an inner shaft 76 large enough to receive one or more predetermined operational components. In some examples, inner shaft 76 of annular cylinder 70 is configured to receive a portion of a turbine engine bearing, a rotor component, and/or one or more other operational components of an operational device that includes a rotating structure. A second radius 75 of cylindrical outer wall 74 is larger than first radius 73 of the cylindrical inner wall 72 such that a volume is formed between the inner wall 72 and outer wall 74 of annular cylinder 70. The volume formed between inner wall 72 and outer wall 74 is contained by connecting the inner and outer walls 72 and 74 at first and second opposing ends. In some examples, inner wall 72 and outer wall 74 as well as end surfaces formed at the first and second opposing ends can be formed using any substantially rigid material, including but not limited to metals (e.g., chrome, steel, alloys thereof or other metallic alloys, etc.), ceramics, high performance plastics and other suitable materials.

Referring still to FIG. 6, magneto-rheological device 50a can further include a magneto-rheological fluid 78 provided to fill the volume between the inner wall 72 and the outer wall 74 of the annular cylinder 70. The stiffness of the opposing ends of annular cylinder can be configured to not dominate the stiffness created by the magneto-rheological fluid 78. In general, magneto-rheological fluid 78 is a non-Newtonian fluid comprising magnetic particles suspended in a carrier oil. In particular examples, magneto-rheological fluid 78 can include magnetic particles such as iron particles characterized by a diameter of between about 3-10 microns and forming 20-40 percent by volume of a carrier liquid such as mineral oil, synthetic oil, water, glycol or the like. One example of a suitable commercially available magneto-rheological fluid is MRF-132DG Magneto-Rheological Fluid offered for sale by Lord Corporation of Cary, N.C.

Magneto-rheological fluid 78 has a viscosity level that can be directly affected by an amount of magnetic field provided within magneto-rheological device 50a. Magnetic field strength can serve to reversibly change the magneto-rheological fluid from a free-flowing, linear, viscous liquid to a semisolid with a controllable yield strength. This viscosity change due to changes in magnetic field can be effected in a very short amount of time, such as on the order of several milliseconds or less, and using generally low voltage levels. When subjected to a magnetic field, the magnetic particles suspended within the carrier oil forming magneto-rheological fluid 78 form chains in the direction of magnetic flux lines.

A magnetic field is introduced within magneto-rheological device 50a at least in part by providing a plurality of electro-magnetic coils 80 positioned around the outer wall 74 of the annular cylinder 70. In some examples, the plurality of electro-magnetic coils 80 are positioned radially around and extending outward from outer wall 74, as shown in FIG. 6. In some examples, the plurality of electro-magnetic coils 80 can be positioned in a different orientation relative to outer wall 74 in a manner that remains capable of introducing a magnetic field through magneto-rheological fluid 78. The plurality of electro-magnetic coils 80 can be fed by at least one current controller 88 that is electrically coupled to the plurality of electro-magnetic coils 80. The amplitude and frequency components of current provided from current controller 88 to coils 80 can serve to control the magnetic field introduced within magneto-rheological device 50a, thus dynamically adjusting the stiffness and damping levels provided within its deployed environment. Additional details regarding current controller 88 and associated system components for controlling operational parameters of magneto-rheological device 50a are depicted in and discussed with reference to FIG. 10.

Although eight coils 80 are illustrated in the example magneto-rheological device 50a of FIG. 6, it should be appreciated that any number of electro-magnetic coils can be used. In addition, the winding forming each electro-magnetic coil 80 can be fashioned to include any number of one or more turns per coil. In some examples, the same number of turns is used for all electro-magnetic coils 80. In some examples, the spacing 82 between adjacent coils 80 around the annular cylinder is substantially equal. In some examples, each electro-magnetic coil 80 is provided with a magnetic core 84 to increase the amount of electric field generated per coil. Magnetic core 84 can be formed from any suitable type of ferro-magnetic material such as but not limited to iron, nickel, cobalt, gadolinium, dysprosium, alloys thereof, or other combinations of materials that exhibit high magnetic characteristics. Electro-magnetic coils 80 can be formed from suitable conductive materials such as copper, aluminum, brass, silver, gold, tin, nickel, chrome, lead, zinc, barium, rhodium, cadmium, cobalt, alloys thereof, and/or other metallic materials.

Referring still to FIG. 6, an inner end 83 of each electro-magnetic coil 80 can be connected to a portion of outer wall 74 and an outer end 84 of each electro-magnetic coil 80 can be mounted on a rigid frame 86 provided to serve as a housing to encase the electro-magnetic coils 80. Although rigid frame 86 is depicted in FIG. 6 as having a generally cylindrical shape, it should be appreciated that rigid frame 86 can take on a variety of forms including any generally prismatic shape. In some examples, such as previously depicted in FIG. 2, inner wall 72 of annular cylinder 70 can be positioned relative to a surface of a squirrel cage or spring bearing cage or alternatively relative to a cylindrical surface surrounding a bearing. Rigid frame 86 towards which electro-magnetic coils 80 can extend radially outwards can be provided as a separate housing for magneto-rheological device 50a or can be formed from an existing rigid engine component, such as an extension of fan hub frame 36.

Figure 7:
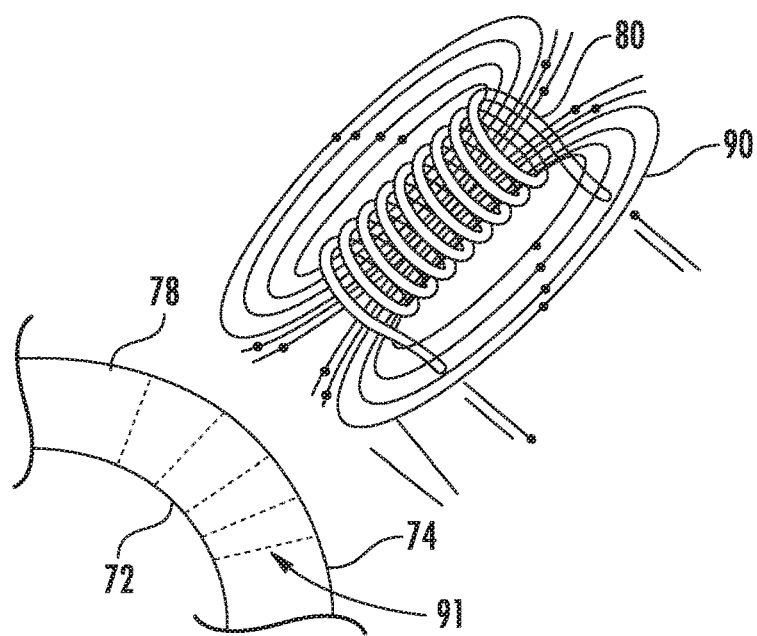
FIG. 7 is a close-up view of a portion of a magneto-rheological device depicting magnetic flux lines according to various embodiments of the present subject matter.

Current controller 88 can be configured to introduce a current through each of the electro-magnetic coils 80, thus creating a magnetic field within the magneto-rheological device 50a and inducing a corresponding magnetic flux through the magneto-rheological fluid 78. FIG. 7 depicts magnetic field lines 90 formed within one coil 80 of magneto-rheological device 50a, while lines 91 depict the magnetic flux induced within the magneto-rheological fluid 78 while subjected to magnetic field 90. In general, magnetic field 90 and magnetic flux 91 are configured to operate radially outward from the cylindrical magneto-rheological device 50a. The level of current provided to each of the plurality of electro-magnetic coils 80 by the one or more current controllers 88 directly affects the viscosity of the magneto-rheological fluid 78 and thus the stiffness level or damping level of the controllable magneto-rheological device 50a.

Figure 8:
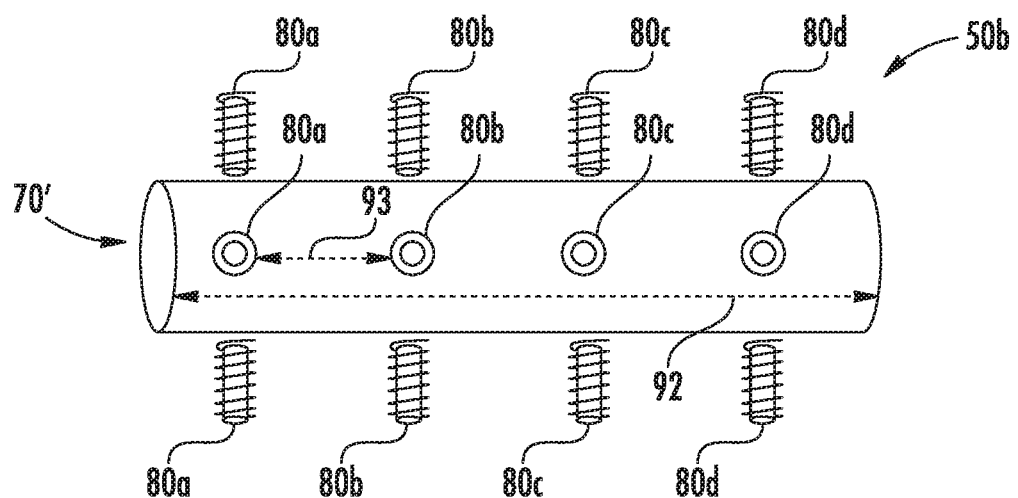
FIG. 8 is a side plan view of a second exemplary magneto-rheological device according to various embodiments of the present subject matter.

FIG. 8 depicts a second example embodiment of a magneto-rheological device 50b, which includes a plurality of annular stacks of electro-magnetic coils arranged relative to annular cylinder 70'. Each annular stack of electro-magnetic coils can be positioned along a length 92 of annular cylinder 70' such that one or more spacings 93 are formed between adjacent annular stacks. The example magneto-rheological device 50b of FIG. 8 includes a first annular stack of electro-magnetic coils corresponding to coils 80a, a second annular stack of electro-magnetic coils 80b, a third annular stack of electro-magnetic coils 80c and a fourth stack of electro-magnetic coils 80d. Although FIG. 8 depicts four annular stacks of electro-magnetic coils, each consisting of four coils (only three of which are visible in the plan view of FIG. 8), it should be appreciated that any number of annular stacks and any number of coils per stack is within the purview of the disclosed technology. Each stack of coils 80a, 80b, 80c, 80d can be positioned with spacing 93 between adjacent stacks in a relatively equidistant position from one another such as depicted in FIG. 8, although equidistant spacing between adjacent annular stacks of coils is not a requirement. Additional features of magneto-rheological devices described herein, such as but not limited to features described relative to magneto-rheological device 50a of FIG. 6, magneto-rheological device 110 of FIG. 9 and others can also be included with the magneto-rheological device 50b of FIG. 8.

Figure 9:
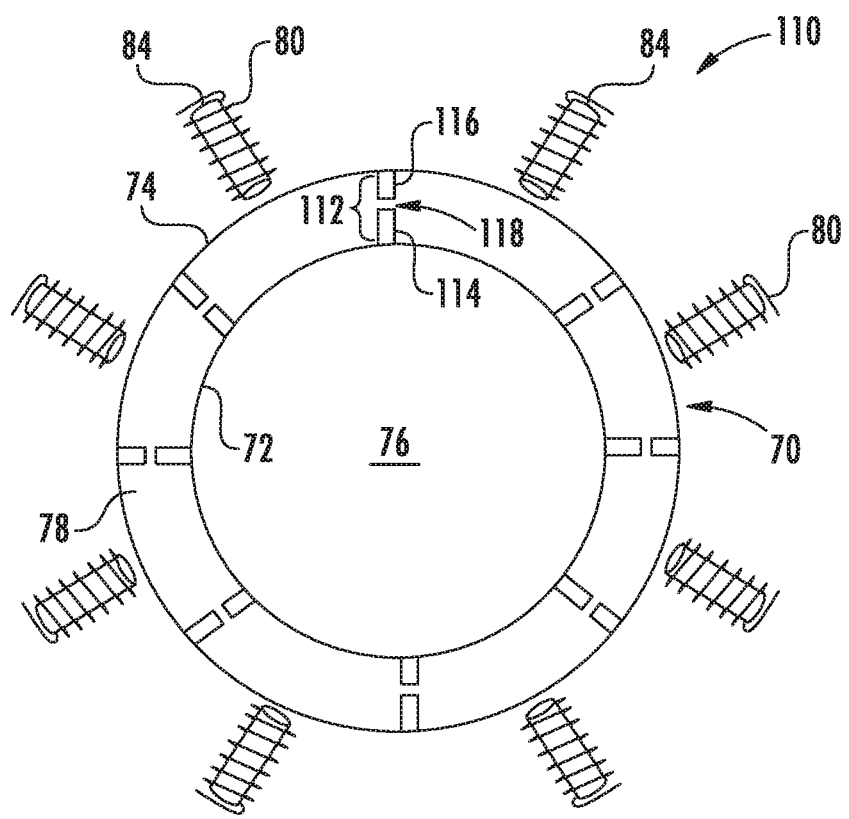
FIG. 9 is a schematic cross-sectional view of a third exemplary magneto-rheological device according to various embodiments of the present subject matter.

FIG. 9 provides a schematic cross-sectional view of a third exemplary magneto-rheological device embodiment 110 according to various aspects of the disclosed technology. Magneto-rheological device 110 is similar in many respects to magneto-rheological device 50a of FIG. 6. As such, features discussed with reference to magneto-rheological device 50a of FIG. 6 are considered equally applicable to similar features illustrated in magneto-rheological device 110 of FIG. 9. Magneto-rheological device 110 of FIG. 9 includes an additional optional feature corresponding to one or more orifices 112 formed within annular cylinder 70. The one or more orifices 112 can be formed between the inner wall 72 and outer wall 74 of annular cylinder 70 to create flow restriction of the magneto-rheological fluid 78 within annular cylinder 70 and corresponding high intensity magnetic flux therein. In some examples, each orifice 112 can include a first extension 114 extending radially outward from inner wall 72 and a second extension 116 extending radially inward from outer wall 74 to form a gap 118 between opposing ends of the first extension 114 and second extension 116. In other examples, only a single extension can be provided from one of the inner wall 72 and outer wall 74 to create a gap between the end of the extension and the opposing wall of annular cylinder 70. Although eight orifices 112 are illustrated in FIG. 9, it should be appreciated that any number of one or more orifices can be provide in accordance with the disclosed technology. The number of orifices 112 can be the same as the number of electro-magnetic coils 80 and corresponding optional magnetic cores 84 or can be different in number. Although orifices 112 are illustrated as generally alternating with the placement of the plurality of electro-magnetic coils 80, the position of orifices 112 relative to electro-magnetic coils can vary in different magneto-rheological device embodiments.

Figure 10:
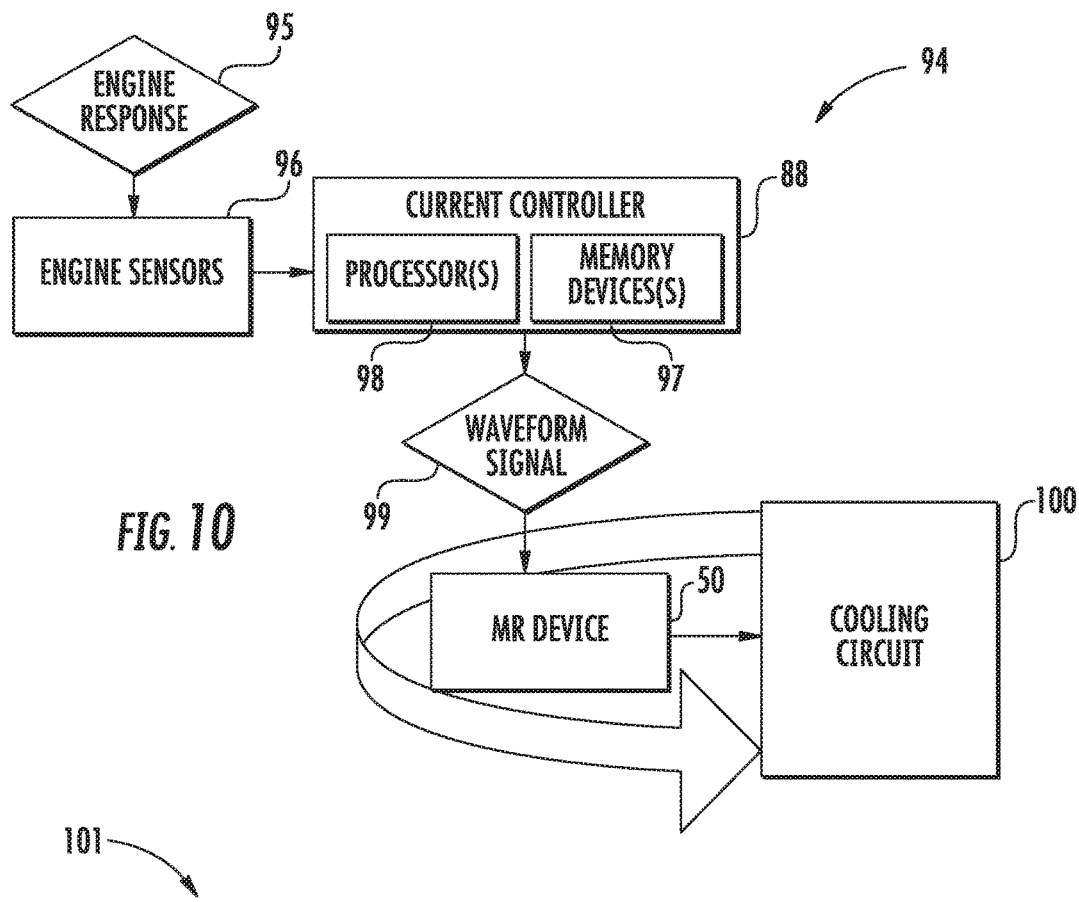
FIG. 10 is a schematic block diagram of example system components for controlling operational parameters of a magneto-rheological device according to various embodiments of the present subject matter.

FIG. 10 is a schematic block diagram of an example control system 94 for controlling operational parameters of a magneto-rheological device 50 according to various embodiments of the present subject matter. Control system 94 can be provided as a distinct control system or integrated with other control systems in an engine or vehicle control system, such as but not limited to a Full Authority Digital Engine Control (FADEC) system, an Electronic Engine Control (EEC) or Engine Control Unit (ECU) system, or other computer-implemented control systems that control aspects of engine performance. Control system 94 can generally track engine response 95 using one or more engine sensors 96. Engine sensors can provide signal data to current controller 88, which can operate as a computing device having one or more memory devices 97 and one or more processors 98. Current controller 88 can process the signal data from engine sensors 96 to actively generate a waveform signal 99 for controlling the current levels provided to magnetic coils within magneto-rheological device 50. Additional control of a cooling circuit 100 also can be provided within control system 94 to help maintain desired operating temperatures for magneto-rheological device 50.

The one or more engine sensors 96 can be positioned at predetermined locations within a gas turbine engine or other engine environment to monitor engine response 95 in real time. Engine sensor(s) 96 can include a tachometer or other sensor for determining engine operating speed, one or more vibration sensors for determining vibrational phenomena within an engine, thermocouple sensors for measuring temperature, pressure sensors, Linear Variable Differential (LVDT) sensors or other positional transducers for measuring quantifiable shifts in engine component locations, resolver sensors, strain gauge sensors, fuel flow sensors, potentiometer sensors, torque sensors, accelerometers, and/or other condition monitoring (CM) sensors.

Signal data captured by engine sensors 96 can be provided to current controller 88 and stored in one or more memory devices 97. One or more processors 98 can also be provided to interact with data stored in memory device(s) 97 or to execute computer-readable instructions stored in the memory device(s) 97. Memory device(s) 97 can include one or more computer-readable media, including, but not limited to, non-transitory computer-readable media, RAM, ROM, hard drives, flash drives, or other memory devices. Processor(s) 98 can include any suitable processing device, such as a microprocessor, microcontroller, integrated circuit, logic device, or other suitable processing device. The one or more memory devices 97 can store information accessible by the one or more processors 98, including computer-readable instructions that can be executed by the one or more processors 98. The instructions can be any set of instructions that when executed by the one or more processors 98, cause the one or more processors 98 to perform operations. The instructions can be written in any suitable programming language or can be implemented in hardware.

Current controller 88 of FIG. 10 can perform numerous specific operations for controlling operational parameters of magneto-rheological device 50. In general, current controller 88 is configured to determine one or more signal characteristics of a waveform signal 99 defining the current introduced through each of the electro-magnetic coils 80. The signal characteristics can include one or more of amplitude, phase and waveform shape, and can be modified over time to provide different operational modes at different engine operating speeds or other conditions. Signal data acquired from engine sensors 96 and/or parameters derived from such sensor signal data can be translated into instructions for providing appropriate current levels by the current controller 88 to the plurality of electro-magnetic coils 80 within a magneto-rheological device 50. Current controller 88 can be configured for continuously controllable operation in real time such that it can be turned on and off as needed and set at different levels as indicated by continuous feedback from sampled sensor data and the like.

Figure 11:
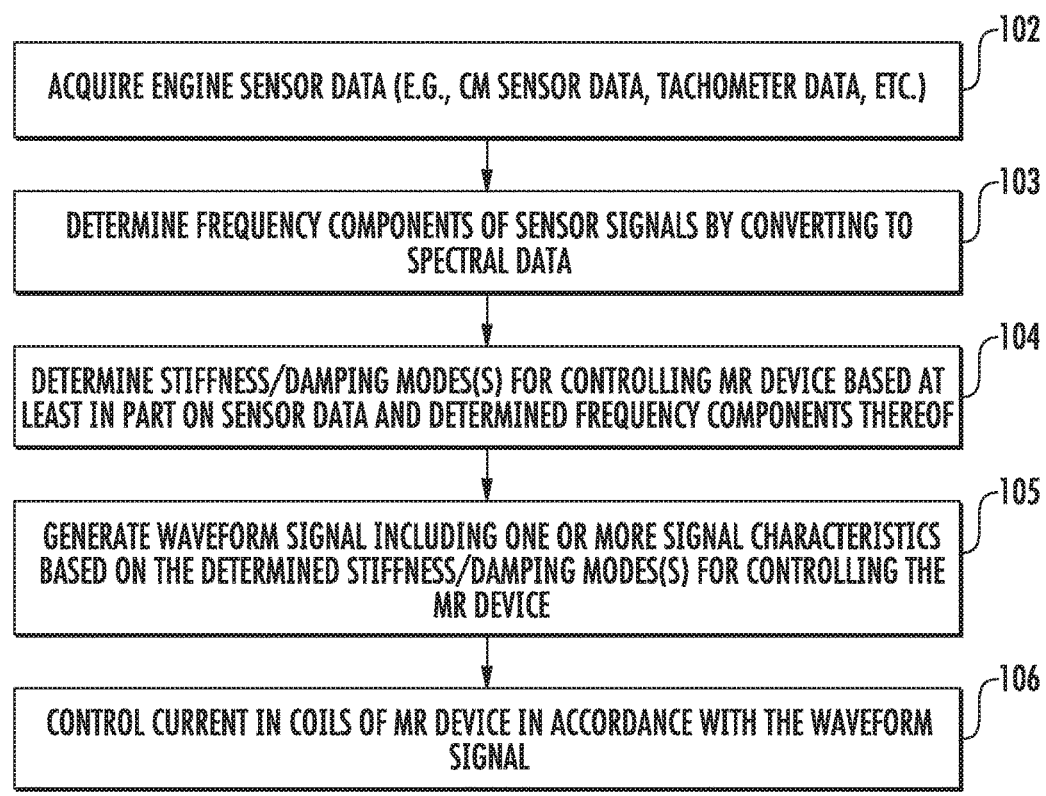
FIG. 11 is a flow diagram of an example method for controlling a magneto-rheological device according to various embodiments of the present subject matter.

A specific embodiment of current controller operations is depicted in the computer-implemented method (101) for controlling a magneto-rheological device represented in FIG. 11. Current controller 88 can be configured to acquire (102) sensor data from one or more engine sensors. Sensor data such as tachometer data and CM sensor data can be helpful in some embodiments. Current controller 88 can be further configured to determine (103) frequency components of the sensor data. For example, sensor data from engine sensors 96 can be processed using a Fast Fourier Transform (FFT) or other signal conversion algorithm that converts the raw sensor data into spectral data. The spectral data provides a frequency domain representation from which one or more frequency components of interest in the sensor data can be determined as corresponding to a source of vibration. Synchronous vibrations within an engine typically can be identified at frequencies corresponding to integer multiples of the 1× frequency, or frequency corresponding with engine operating speed. Non-synchronous vibrations within an engine can be identified at frequencies different than the 1× frequency.

Current controller 88 can be further configured to determine (104) one or more stiffness/damping modes for controlling magneto-rheological device 50. The stiffness/damping mode(s) can be determined at (104) based at least in part on the sensor data acquired at (102) and frequency components determined at (103) as corresponding to a source of vibration within the engine. A first stiffness/damping mode example determined at (104) corresponds to a symmetrical mode that provides symmetrical stiffness/damping within a magneto-rheological device, more specific aspects of which are discussed with reference to FIG. 12. A second stiffness/ damping mode example determined at (104) corresponds to an asymmetrical mode that provides asymmetrical stiffness/damping within a magneto-rheological device, which is more specifically described with reference to FIG. 13. A third stiffness/damping mode example determined at (104) corresponds to a rotational mode that provides rotating stiffness/damping within a magneto-rheological device, as more particularly described with reference to FIG. 14.

Referring still to FIGS. 10 and 11, current controller 88 can be configured to actively generate (105) a waveform signal 99 defined by one or more amplitude and/or phase levels based on the one or more frequency components determined at (103) and the one or more stiffness/damping modes determined at (104). Current phase and/or amplitude levels as well as shape of current waveform signal 99 can then be controlled in the electro-magnetic coils of magneto-rheological device 50 at (106) in accordance with the waveform signal actively generated at (105). The current levels controlled at (106) can thus vary in amplitude, phase and/or waveform shape to customize stiffness/damping characteristics of the magneto-rheological device to mitigate a variety of vibration phenomena. The waveform signal 99 actively generated at (105) can change over time as the engine response 95 changes. For example, as engine speed increases or decreases, so can the amplitude of waveform signal 99 increase or decrease. In another example, as engine speed approaches a known resonant mode, waveform signal 99 can be modified to control the stiffness/damping within magneto-rheological device 50 and address the expected vibrational response at particular frequencies.

Active generation (105) of waveform signal 99 can be implemented through the coordination of memory device(s) 97 and processor(s) 98 within current controller 88, which together function to provide semi-active logic for initiating control of the disclosed magneto-rheological devices in accordance with different waveform signals 99 and corresponding stiffness/damping modes. For example, the one or more memory devices 97 can store data identifying known speed-related engine data or other parameters (e.g., expected speeds or times during start-up that an engine might benefit from a magneto-rheological device controlled to provide additional stiffness, or expected resonant frequencies during which an engine might benefit from a magneto-rheological device controlled to introduce targeted stiffness/damping for shifting the resonant mode from occurring at the expected engine operating speed(s).) Data can also be stored in memory device(s) 97 indicating one or more threshold levels for current engine speed relative to the known speed-related engine parameters. As current engine speeds are detected to cross these threshold levels, instructions stored within memory device(s) 97 can be provided to actively instruct the one or more processor(s) 98 to perform operations that dynamically generate waveform signal 99 in a manner that actively shifts as engine speed approaches the predetermined thresholds. The instructions can identify when to switch from one stiffness/damping mode to another and/or how to adjust the amplitude, phase and/or waveform shape of waveform signal 99 to customize stiffness/damping characteristics of the magneto-rheological device to mitigate known vibration phenomena.

Figure 12:
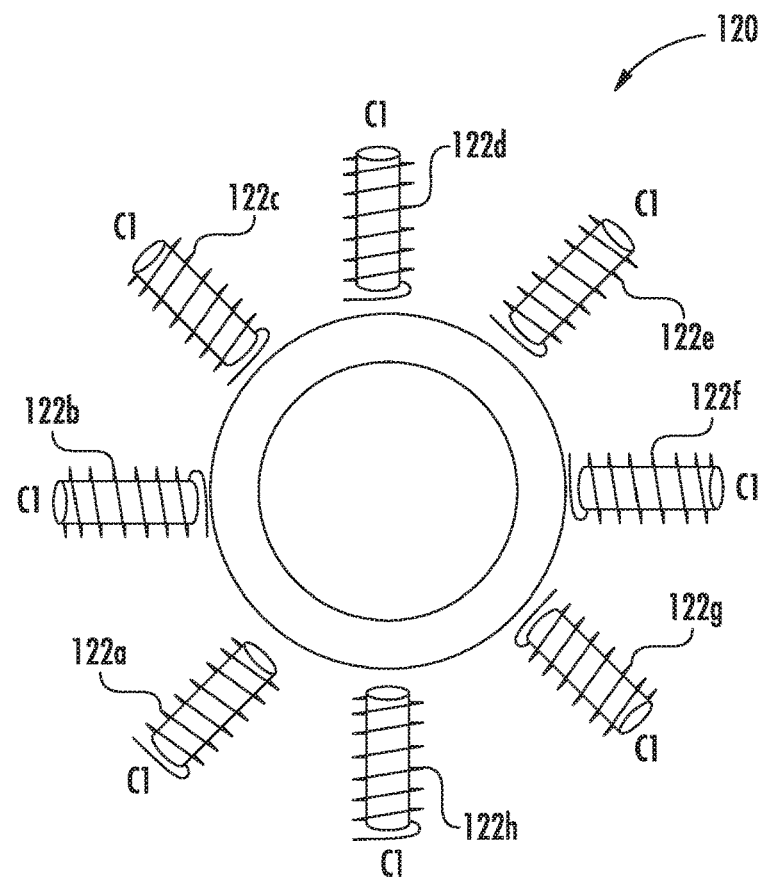
FIG. 12 is a schematic representation of an exemplary magneto-rheological device operating according to a first example current control configuration of the present subject matter.
Figure 13:
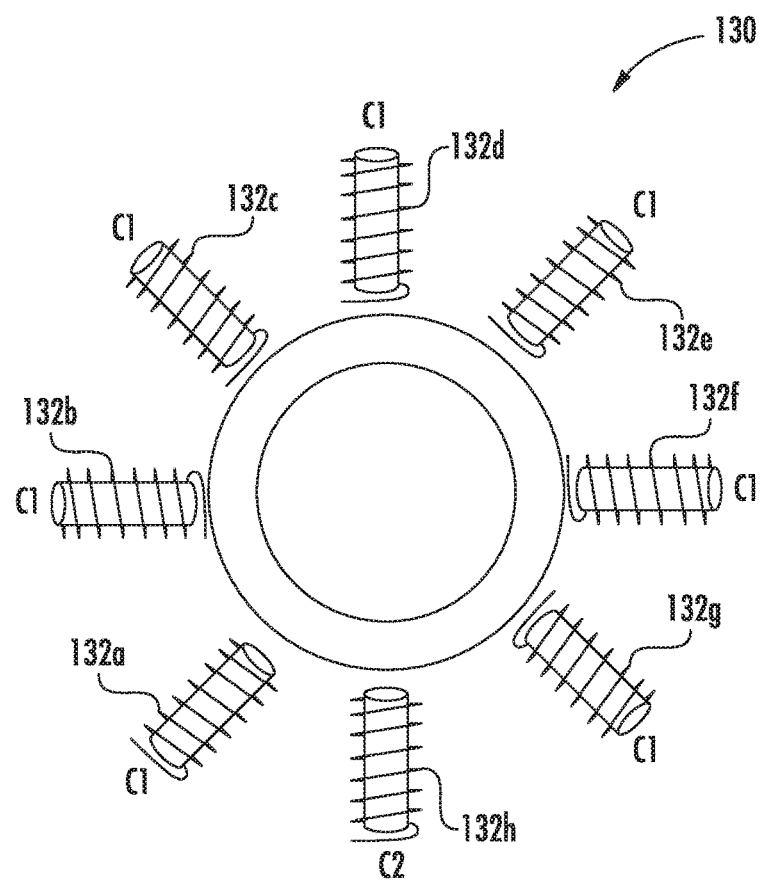
FIG. 13 is a schematic representation of an exemplary magneto-rheological device operating according to a second example current control configuration of the present subject matter.
Figure 14:
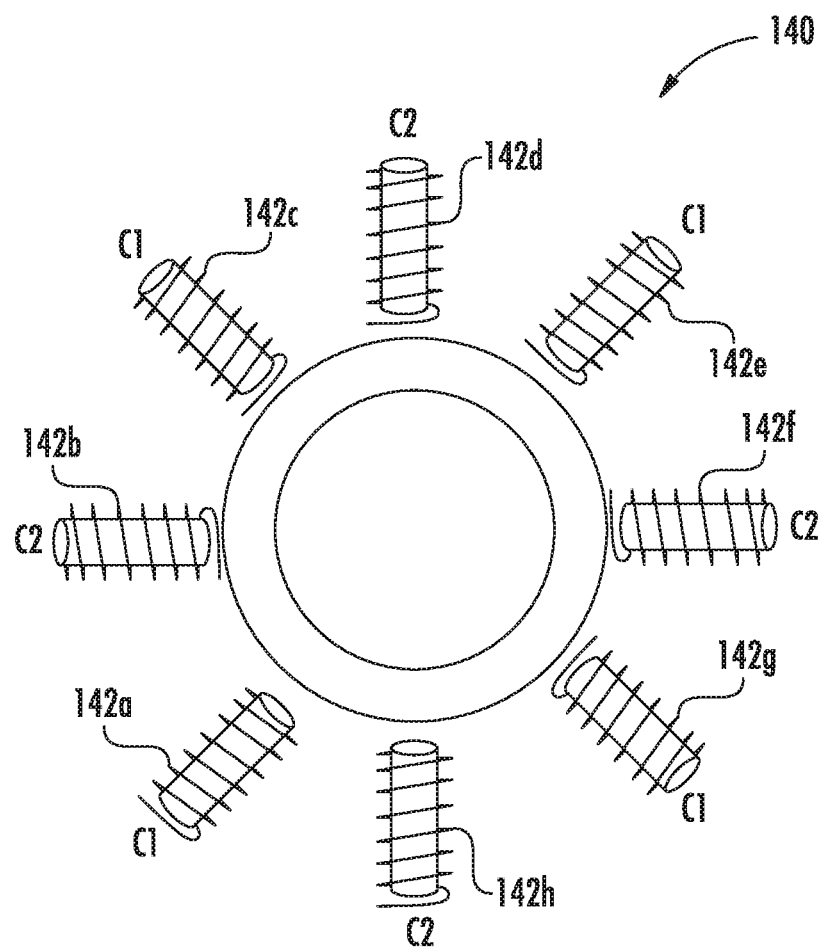
FIG. 14 is a schematic representation of an exemplary magneto-rheological device operating according to a third example current control configuration of the present subject matter.

Referring now to FIGS. 12-14, different example current control configurations for implementing different determined stiffness/damping modes in a magneto-rheological device are depicted, each of which may be employed under different engine operating conditions to achieve mission-specific and/or geometry-specific variable adaptive stiffness/damping conditions. Different current control configurations generally can be implemented by the at least one current controller that actively generates a waveform signal that dictates the amplitude and phase level(s) of current fed into the plurality of electro-magnetic coils within a magneto-rheological device. In various examples, the current fed to each coil in a magneto-rheological device can be uniquely modified over time in both amplitude and shape of waveform to mitigate specific types of vibration.

FIG. 12 depicts a first example current flow configuration 120 that can be used to operate a magneto-rheological device in accordance with the disclosed technology in a first stiffness/damping mode, i.e., a symmetrical mode. In the first example current flow configuration 120, a level of current C1 provided from the one or more current controllers 88 to each of the plurality of electro-magnetic coils 122$a$-122$h$ is substantially the same for all of the plurality of electro-magnetic coils at a particular speed point. In some examples, the level of current C1 provided to coils 122$a$-122$h$ can be determined as a function of engine speed to provide a semi-active device that adapts the damping/stiffness level versus speed. In other words, once the speed changes, the current C1 provided to all coils 122$a$-122$h$ can also change.

In some examples, a magneto-rheological device operating in accordance with first current flow configuration 120 can serve to reduce modal response in bowed rotor starts by providing increased stiffness at the 3R bearing and/or 4R bearing locations during a predetermined period of time during startup. In some examples, stiffness introduced by such a controllable device can be provided in a range of several seconds, such as an amount of time between about one (1) second and about ten (10) seconds.

In other examples, a magneto-rheological device operating in accordance with first current flow configuration 120 can serve to reduce instability caused by cross coupled stiffness (Alford) forces or other non-synchronous vibration (NSV) by operating during high power engine performance to affect a mode shape of engine dynamics response. In such examples, a magneto-rheological device can be provided at locations such as but not limited to a mid-rotor (inter-shaft) location along an HP shaft, an aft bearing location near the turbine support (e.g., 4R bearing location), or others. At the 4R bearing location, a magneto-rheological device can be activated at high power to provide a stiff 4R load path that helps decrease turbine closure and improves stability margin.

FIG. 13 depicts a second example current flow configuration 130 that can be used to operate a magneto-rheological device in accordance with the disclosed technology in a second stiffness/damping mode, i.e., an asymmetrical mode. In general, by providing one or more different current levels at different coils, an asymmetric stiffness distribution that varies across the circumference of a magneto-rheological device can be created. The asymmetric stiffness distribution can be defined in terms of first and second fixed directional stiffness/damping components (e.g., Kx and Ky components defining levels of stiffness in respective x (lateral) and y (vertical) directions, and Bx and By components defining levels of damping in respective x and y directions.) The asymmetric stiffness/damping distribution generated within the asymmetric mode can be defined by different waveform signals at different particular speeds. Because the different current levels in each coil can vary in amplitude as well as waveform shape, asymmetric stiffness distributions can be implemented to mitigate a variety of vibration phenomena, including non-synchronous vibrations.

In the second example current flow configuration 130, a first current C1 is provided by the one or more current controllers 88 to a first portion of the plurality of electro-magnetic coils, including coils 132a, 132b, 132c, 132d, 132e, 132f and 132g. A second current C2 is provided by the one or more current controllers 88 to a second portion of the plurality of electro-magnetic coils, including coil 132h. In FIG. 13, the second portion of the plurality of electro-magnetic coils corresponds to only a single coil. However, multiple coils can be included in each first and second portion in other examples. Other examples may utilize more than two different current levels that can be fed to the electro-magnetic coils 132a-132h. Different current levels in different coils than illustrated can be chosen to create different asymmetric or axisymmetric configurations.

In some examples, a magneto-rheological device operating in accordance with second current flow configuration 130 can serve to provide active control in targeted directions based on detected vibration response within an engine application. For example, the first and/or second portions of the plurality of electro-magnetic coils 132a-132h can be provided at a predetermined location relative to the annular cylinder to provide active support stiffness that dynamically changes to manage vibrations and achieve desired engine response characteristics.

FIG. 14 depicts a third example current flow configuration 140 that can be used to operate a magneto-rheological device in accordance with the disclosed technology in a third stiffness/damping mode, i.e., a rotating mode. In some examples, a magneto-rheological device operating in accordance with third current flow configuration 140 can provide targeted stiffness or damping at specific locations to offset dynamic response evident during operation. In such instances, customizable stiffness and/or damping can be employed to shift a resonant mode away from being exhibited at an otherwise expected operating speed. The frequency of such resonant modes can be determined in sensor data processing at (103) of FIG. 11 and used to supply current levels to coils within a magneto-rheological device that create a rotating stiffness that tracks detected unbalance. The current levels and corresponding rotating stiffness can be sinusoidal in distribution in response to the harmonic nature of detected vibrational response within the engine. In some examples, the current defined by waveform signal 99 can be a sum of multiple sinusoidal components, each corresponding to a unique frequency component determined at (103). A multi-frequency rotating stiffness can help to mitigate synchronous as well as non-synchronous and/or sub-synchronous vibrational phenomena.

In the third example current flow configuration 140 of FIG. 14, a first current C1 is provided by the one or more current controllers 88 to a first portion of the plurality of electro-magnetic coils, including coils 142a, 142c, 142e and 142g. A second current C2 is provided by the one or more current controllers 88 to a second portion of the plurality of electro-magnetic coils, including coils 142b, 142d, 142f and 142h. In the current flow configuration 140 of FIG. 14, the first portion of the plurality of electro-magnetic coils carrying a first current C1 alternate around the circumference of the annular cylinder with the second portion of the plurality of electro-magnetic coils carrying a second current C2 such that each pair of adjacent electro-magnetic coils has a different level of current.

Figure 15:
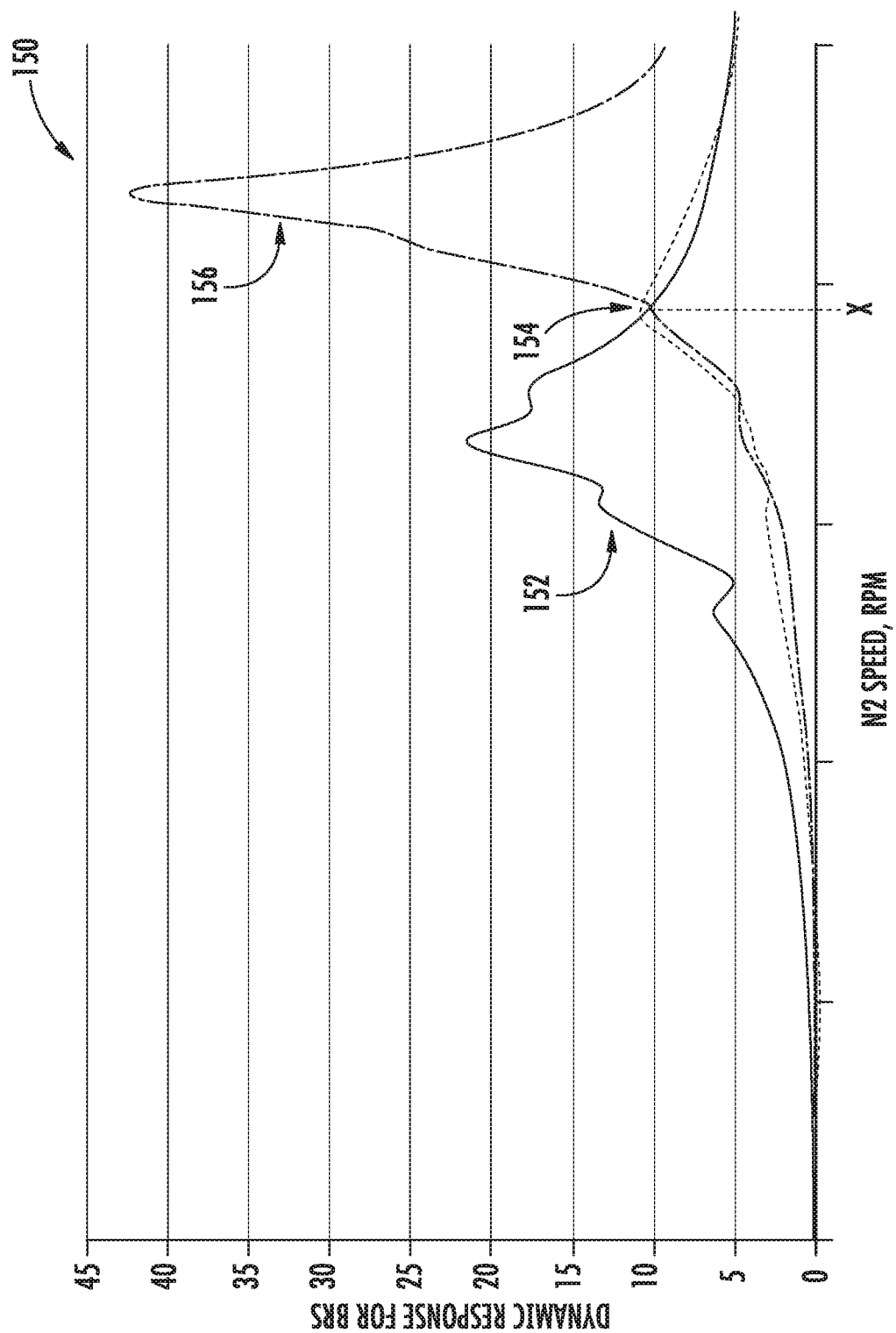
FIG. 15 is a graphical depiction of dynamic response in a gas turbine engine during a bowed rotor start with and without use of a magneto-rheological device according to various embodiments of the present subject matter.

FIG. 15 is a graphical depiction 150 of dynamic response in a gas turbine engine during a bowed rotor start with and without use of a magneto-rheological device according to various embodiments of the present subject matter. Graphical depiction 150 plots the dynamic response for a bowed-rotor start (BRS) event versus engine speed measured in rotations per minute (RPM). A first plot 152 represents baseline engine performance without use of a magneto-rheological (MR) device as disclosed herein. A second plot 154 represents engine performance using an MR device as disclosed herein that is switched on during engine start up until an engine speed of X RPM is reached. A third plot represents engine performance using an MR device as disclosed herein that is switched on during the entire engine start up. As indicated by FIG. 15, dynamic response can be improved by using an MR device to create additional stiffness until engine speed reaches a threshold level (e.g., X RPM). Beyond the threshold level, dynamic response can be improved by switching the MR device off and providing less damping effect within the engine operational components proximate to the MR device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A controllable magneto-rheological device, comprising:
    an annular cylinder formed by inner and outer walls connected at first and second opposing ends, the inner wall of the annular cylinder defining an inner shaft configured to receive an operational component;
    a magneto-rheological fluid provided to fill a volume defined by and extending between the inner wall and the outer wall of the annular cylinder;
    a plurality of coils positioned on an exterior surface of the outer wall of the annular cylinder, each of the plurality of coils formed from a conductive material to include any number of one or more turns per coil, each of the plurality of coils comprising an inner end and an outer end, the inner end connected to the outer wall of the annular cylinder, and each of the plurality of coils extending outwardly from the exterior surface of the outer wall along a radial direction; and
    one or more current controllers coupled to the plurality of coils, the one or more current controllers configured to introduce a current through each of the plurality of coils and to generate a corresponding magnetic flux through the magneto-rheological fluid;
    wherein a level of current provided to each of the plurality of coils by the one or more current controllers directly affects the viscosity of the magneto-rheological fluid and thus stiffness or damping levels of the controllable magneto-rheological device.

2. The controllable magneto-rheological device of claim 1, wherein the one or more current controllers are configured to determine one or more signal characteristics of a waveform signal defining the current introduced through each of the plurality of coils, and wherein the one or more signal characteristics can be modified over time.

3. The controllable magneto-rheological device of claim 2, wherein the one or more signal characteristics of the waveform signal defining the current introduced through each of the plurality of coils comprises one or more of an amplitude, phase and waveform shape.

4. The controllable magneto-rheological device of claim 1, further comprising a plurality of magnetic cores, each magnetic core disposed within one of the plurality of coils.

5. The controllable magneto-rheological device of claim 1, further comprising:
   an operational component of an engine received within the inner shaft of the annular cylinder; and
   one or more sensors for monitoring engine response, wherein the one or more sensors are coupled to the one or more current controllers such that the current provided to the plurality of coils is determined at least in part from the engine response.

6. The controllable magneto-rheological device of claim 5, wherein the one or more sensors comprise one or more of a tachometer for determining engine operating speed and a vibration sensor for determining vibrational phenomena within the engine.

7. The controllable magneto-rheological device of claim 1, wherein the plurality of coils comprise one or more annular stacks of coils positioned along a length of the annular cylinder such that one or more spacings are formed between adjacent annular stacks.

8. The controllable magneto-rheological device of claim 1, further comprising one or more orifices formed between the inner and outer walls of the annular cylinder to create flow restriction of the magneto-rheological fluid within the annular cylinder.

9. The controllable magneto-rheological device of claim 1, wherein a level of current provided from the one or more current controllers to each of the plurality of coils is substantially the same for all of the plurality of coils to create a symmetrical stiffness within the magneto-rheological device.

10. The controllable magneto-rheological device of claim 1, wherein a first level of current is provided by the one or more current controllers to a first portion of the plurality of coils, wherein a second level of current is provided by the one or more current controllers to a second portion of the plurality of coils, and wherein the first level of current differs from the second level of current to create an asymmetrical stiffness within the magneto-rheological device.

11. A gas turbine engine, comprising:
   a compressor section including one or more compressors;
   a turbine section located downstream of the compressor section, the turbine section including one or more turbines;
   one or more controllable magneto-rheological devices positioned relative to one or more operational components of the one or more compressors or the one or more turbines, each controllable magneto-rheological device comprising:
   an annular cylinder formed by inner and outer walls connected at first and second opposing ends, the inner wall of the annular cylinder defining an inner shaft configured to receive one or more operational components of the one or more compressors or the one or more turbines;
   a magneto-rheological fluid provided to fill a volume defined by and between the inner wall and the outer wall of the annular cylinder;
   a plurality of coils positioned on an exterior surface of the outer wall of the annular cylinder, each of the plurality of coils formed from a conductive material to include any number of one or more turns per coil, each of the plurality of coils comprising an inner end and an outer end, the inner end connected to the outer wall of the annular cylinder, and each of the plurality of coils extending outwardly from the exterior surface of the outer wall along a radial direction; and
   one or more current controllers coupled to the plurality of coils, the one or more current controllers configured to introduce a current through each of the plurality of coils and to generate a corresponding magnetic flux through the magneto-rheological fluid.

12. The gas turbine engine of claim 11, wherein the one or more current controllers are configured to determine one or more of an amplitude, phase or waveform shape for a waveform signal defining the current introduced through each of the plurality of coils, and wherein the amplitude, phase or waveform shape for the waveform signal can be modified over time.

13. The gas turbine engine of claim 11, further comprising one or more sensors for detecting speed or vibration of the gas turbine engine, wherein the one or more sensors are coupled to the one or more current controllers such that a current level provided to the plurality of coils is determined at least in part from the speed or the vibration of the gas turbine engine.

14. The gas turbine engine of claim 11, further comprising one or more orifices formed between the inner and outer walls of the annular cylinder to create flow restriction of the magneto-rheological fluid within the annular cylinder.

15. The gas turbine engine of claim 11, wherein the plurality of coils comprise one or more annular stacks of coils positioned along a length of the annular cylinder such that one or more spacings are formed between adjacent annular stacks.

16. A method for controlling a magneto-rheological device, comprising:
   acquiring, by one or more processors, sensor data from one or more sensors positioned within an operational device;
   determining, by the one or more processors, one or more frequency components of the sensor data as corresponding to a source of vibration within the operational device;
   determining, by the one or more processors, one or more stiffness/damping modes for operation of a magneto-rheological device, wherein the one or more stiffness/damping modes are determined based at least in part on the sensor data and the one or more frequency components;
   generating, by the one or more processors, a waveform signal defined by one or more signal characteristics, wherein the one or more signal characteristics are determined based at least in part on the one or more stiffness/damping modes; and
   controlling, by the one or more processors, current in a plurality of coils within the magneto-rheological device in accordance with the waveform signal and one or more signal characteristics, wherein the plurality of coils are formed from a conductive material to include any number of one or more turns per coil, and wherein each of the plurality of coils comprise an inner end and an outer end, the inner end connected to an outer wall within the magneto-rheological device.

17. The method of claim 16, wherein determining frequency components of the sensor data comprises performing a Fast Fourier Transform (FFT) to convert the sensor data into spectral data.

18. The method of claim 16, wherein the one or more stiffness/damping modes comprise a first stiffness/damping mode that provides symmetrical stiffness/damping within a magneto-rheological device, a second stiffness/damping mode that provides asymmetrical stiffness/damping within a magneto-rheological device, and a third stiffness/damping mode that provides rotating stiffness/damping within a magneto-rheological device.

19. The method of claim 16, wherein the one or more frequency components of the sensor data corresponding to the source of vibration within the operational device comprise one or more of a frequency component corresponding to a synchronous vibration or a frequency component corresponding to a non-synchronous vibration.

20. The method of claim 16, wherein the one or more signal characteristics of the waveform signal comprise one or more of amplitude, phase and waveform shape, and wherein the waveform signal changes over time with changes to the sensor data.

\* \* \* \* \*